(12) United States Patent
Frish

(10) Patent No.: US 9,797,798 B2
(45) Date of Patent: Oct. 24, 2017

(54) SYSTEMS AND METHODS FOR SENSITIVE OPEN-PATH GAS LEAK AND DETECTION ALARM

(71) Applicant: Physical Sciences, Inc., Andover, MA (US)

(72) Inventor: Michael B. Frish, Andover, MA (US)

(73) Assignee: Physical Sciences, Inc., Andover, MA (US)

( * ) Notice: Subject to any disclaimer, the term of this patent is extended or adjusted under 35 U.S.C. 154(b) by 368 days.

(21) Appl. No.: 14/163,475

(22) Filed: Jan. 24, 2014

(65) Prior Publication Data

US 2015/0054650 A1 Feb. 26, 2015

Related U.S. Application Data

(60) Provisional application No. 61/868,275, filed on Aug. 21, 2013.

(51) Int. Cl.
*G01M 3/20* (2006.01)
*G01M 3/22* (2006.01)
*F17D 5/02* (2006.01)

(52) U.S. Cl.
CPC ............... *G01M 3/202* (2013.01); *F17D 5/02* (2013.01); *G01M 3/22* (2013.01); *G01M 3/226* (2013.01)

(58) Field of Classification Search
CPC ........ G01M 3/202; G01M 3/22; G01M 3/226; F17D 5/02
See application file for complete search history.

(56) References Cited

U.S. PATENT DOCUMENTS

| | | | | | |
|---|---|---|---|---|---|
| 5,454,436 | A | * | 10/1995 | Jardine | E21B 44/04 175/40 |
| 7,075,653 | B1 | * | 7/2006 | Rutherford | G01F 23/14 250/338.5 |
| 2006/0262311 | A1 | * | 11/2006 | Muta | G01J 3/433 356/437 |
| 2011/0002546 | A1 | * | 1/2011 | Conger | G01N 21/3504 382/191 |

* cited by examiner

*Primary Examiner* — James Yang
(74) *Attorney, Agent, or Firm* — Bracewell LLP; Douglas W. Rommelmann

(57) ABSTRACT

An apparatus for detecting leaks from a gas pipeline or storage system includes a light source configured to emit a beam with at least one spectral component capable of interacting with pipeline gas, a reflector configured to reflect a portion of the beam, an optical detector configured to detect the reflected beam, a signal processing module coupled to the output of the optical detector configured to analyze the detected beam and output a measured concentration value that characterizes the amount of target gas in the beam path, and a statistical processing module coupled to the signal processing module configured to store and analyze the measured concentration value. The statistical processing module is further configured to compute a value based on statistical information associated with the stored plurality of concentration values and compare the computed value to a first predetermined threshold, and transmit a first alarm signal if the computed value is greater than the first predetermined threshold.

26 Claims, 10 Drawing Sheets

Table 1

FIG. 4

| Sample Mean (μ) | $$\mu = \sum_{i=1}^{N} x_i$$ |
|---|---|
| Standard Deviation (σ) | $$\sigma = \sqrt{\frac{1}{N}\sum_{i=1}^{N}(x_i - \mu)^2}$$ |
| Skewness ($g_1$) | $$g_1 = \frac{1}{N}\sum_{i=1}^{N}\frac{(x_i - \mu)^3}{\sigma^3}$$ |
| Kurtosis ($g_2$) | $$g_2 = \frac{1}{N}\sum_{i=1}^{N}\frac{(x_i - \mu)^4}{\sigma^4}$$ |

Table 2

FIG. 6

SYSTEMS AND METHODS FOR SENSITIVE OPEN-PATH GAS LEAK AND DETECTION ALARM

CROSS-REFERENCE TO RELATED APPLICATION

This application claims priority to and the benefit of, and incorporates herein by reference in its entirety, U.S. Provisional Patent Application No. 61/868,275, which was filed on Aug. 21, 2013.

FIELD OF THE INVENTION

The present invention relates, generally, to systems and methods for detecting gas leaks from gas pipeline and storage systems.

BACKGROUND OF THE INVENTION

Industrial quality open-path laser-based trace gas monitors and alarms have been commercially available since their introduction in the 1990s. These devices are now produced, sold, installed, maintained, and serviced by several companies worldwide. They are deployed for monitoring routine industrial and agricultural emissions or leaks of hazardous gases such as hydrogen fluoride, hydrogen sulfide, and ammonia. They are used in environmental research and monitoring applications for greenhouse gas and pollution detection and measurement.

Most current laser-based open-path sensors utilize a mono-static configuration: a laser beam projects from a transceiver to a distant retroreflector, wherefrom the laser beam returns to the transceiver. The return beam carries information describing the amount of target gas within the beam path. See U.S. Pat. No. 7,075,653 to Rutherford, the entire disclosure of which is hereby incorporated by reference.

While current commercially-available open-path gas monitors are capable of detecting large gas leaks, they suffer from limited sensitivity to small leaks (e.g. leaks smaller than the natural variability of the background gas concentration), or intermittent leaks. Furthermore, stability of alignment between the transceiver and retroreflector, as well as obstacles or obscurants in the laser path, can cause measurement noise and drift or dropout that limit leak detection ability.

SUMMARY OF THE INVENTION

The invention, in various embodiments, features a method and apparatus for monitoring gas pipelines and related infrastructure and detecting small (e.g., smaller than the natural local variability of the background gas concentration), intermittent gas leaks. In some embodiments, the invention features a high data rate continuously operating open-path sensor configuration that overcomes the limitations of current commercial open-path sensors posed by alignment stability and obscurants.

The invention makes use of temporal statistical fluctuations of the vapor signal, caused by the dynamics of the leaking vapor as transported by the wind, to identify and quantify patterns indicative of localized vapor emissions. The invention has been demonstrated by months of operation and evaluation at a controlled natural gas leak test site using a prototype open-path monitor system.

Higher-order statistics refer generally to functions of the third or higher power of a statistical sample. For example, the skewness of a statistical sample is a higher-order statistic whereas the mean and standard deviation of a statistical sample are examples of low-order statistics. The skewness of a statistical sample can be used to evaluate the shape of a statistical distribution. For example, the skewness can be used to determine if more of the sample points lie to one side of the mean than the other.

The use of higher-order statistics such as skewness can be particularly advantageous for detecting gas leaks because gas leaks cause predominantly positive fluctuations in the measured gas concentration (positive skewness), while random environmental noise tends to cause negative and positive fluctuations in more or less equal proportions (zero skewness).

In one aspect, the invention features a method for detecting leaks in a gas pipeline system. The method involves measuring a gas concentration over a first time interval. The method further involves averaging a plurality of measured gas concentration values over a second time interval and storing the averaged value in a memory. Additionally, the method further involves computing a standard deviation and a second statistic of the plurality of measured gas concentration values relative to the stored average values. Moreover, the method further involves computing an alarm value based on the standard deviation, the second statistic and a first predetermined threshold.

In some embodiments, the method involves storing the alarm value in a memory. The method further involves repeatedly measuring a gas concentration, averaging a plurality of measured gas concentration values, computing statistics relative to the stored average values, and storing the results. The method further involves computing an alarm probability based on a plurality of stored alarm values. Additionally, the method further involves transmitting an alarm message if the alarm probability is greater than a second predetermined threshold.

In some embodiments, the second statistic can be a skewness. In some embodiments, the gas concentration can be measured using tunable diode laser absorption spectroscopy (TDLAS). In some embodiments, the gas concentration can be measured with an open-path configuration. In some embodiments, the first time interval is about 100 ms. In some embodiments, the second time interval is about 5 minutes. In some embodiments, the alarm value can be computed based on the standard deviation multiplied by the skewness. In some embodiments, the alarm value can be computed based on a polynomial of the standard deviation multiplied by a polynomial of the skewness. In some embodiments, the measured gas can be one of $CO_2$, methane, hydrogen fluoride, hydrogen sulfide, or ammonia.

In some embodiments, the method further involves comparing the measured gas concentration with a third predetermined threshold and transmitting an alternate alarm message if the measured gas concentration is greater than the third predetermined threshold.

In another aspect, the invention features a gas detection apparatus for detecting leaks from a gas pipeline. The gas detection apparatus includes a light source emitting a beam with at least one spectral component capable of interacting with pipeline gas. The gas detection apparatus also includes a reflector reflecting a portion of the beam. The gas detection apparatus also includes an optical detector detecting the reflected beam. The gas detection apparatus also includes a signal processing module coupled to the output of the optical detector for analyzing the detected beam and outputting a measured concentration value that characterizes the amount of pipeline gas in the beam path. The gas detection apparatus also includes a statistical processing module coupled to the signal processing module for storing and analyzing the measured concentration value.

In some embodiments, the statistical processing module computes a value based on statistical information associated with the stored plurality of concentration values and compares the computed value to a first predetermined threshold. In some embodiments, the statistical processing module transmits a first alarm signal if the computed value is greater than the first predetermined threshold. In some embodiments, the pipeline gas can be one of $CO_2$, methane, hydrogen fluoride, hydrogen sulfide, or ammonia. In some embodiments, the light source can be a laser configured to measure the gas concentration via tunable diode laser absorption spectroscopy.

In some embodiments, the computed value can be a skewness. In some embodiments, the statistical module can compare the measured concentration value with a second predetermined threshold and can transmit a second alarm message if the measured concentration value is greater than the second predetermined threshold.

In yet another aspect, the invention features a method for detecting gas leaks in a gas pipeline system. The method involves measuring a gas concentration over a first time interval. The method further involves storing a plurality of gas concentration values in a memory. The method further involves averaging the stored gas concentration over a second time interval. The method further involves computing statistical information associated with the stored values over the second time interval. The method further involves computing a value based on the statistical information. The method further involves comparing the computed value to a first predetermined threshold. The method further involves setting an alarm to a first value if the computed value is greater than the first predetermined threshold. The method further involves setting an alarm to a second value if the computed value is less than or equal to the first predetermined threshold.

In some embodiments, the method involves storing the alarm value in a memory. The method further involves computing an alarm probability as an average of stored alarm values over a third time interval. Additionally, the method further involves transmitting a first alarm message if the alarm probability is greater than a second predetermined threshold.

In some embodiments, the second time interval can be about 5 minutes. In some embodiments, the third time interval can be about 1 hour. In some embodiments, the first time interval can be about 100 ms. In some embodiments, the gas can be one of $CO_2$, methane, hydrogen fluoride, hydrogen sulfide, or ammonia. In some embodiments, the computed value can be a skewness multiplied by a standard deviation.

In some embodiments, the method involves comparing the averaged gas concentration with a third predetermined threshold and transmitting a second alarm message if the averaged gas concentration is greater than the third predetermined threshold.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a table showing the location and duration of leaks at the test site where the data shown in FIGS. 3A-3D was measured, according to an illustrative embodiment of the invention.

FIG. 6 is a table showing various sample statistics.

DETAILED DESCRIPTION

Figure 1:
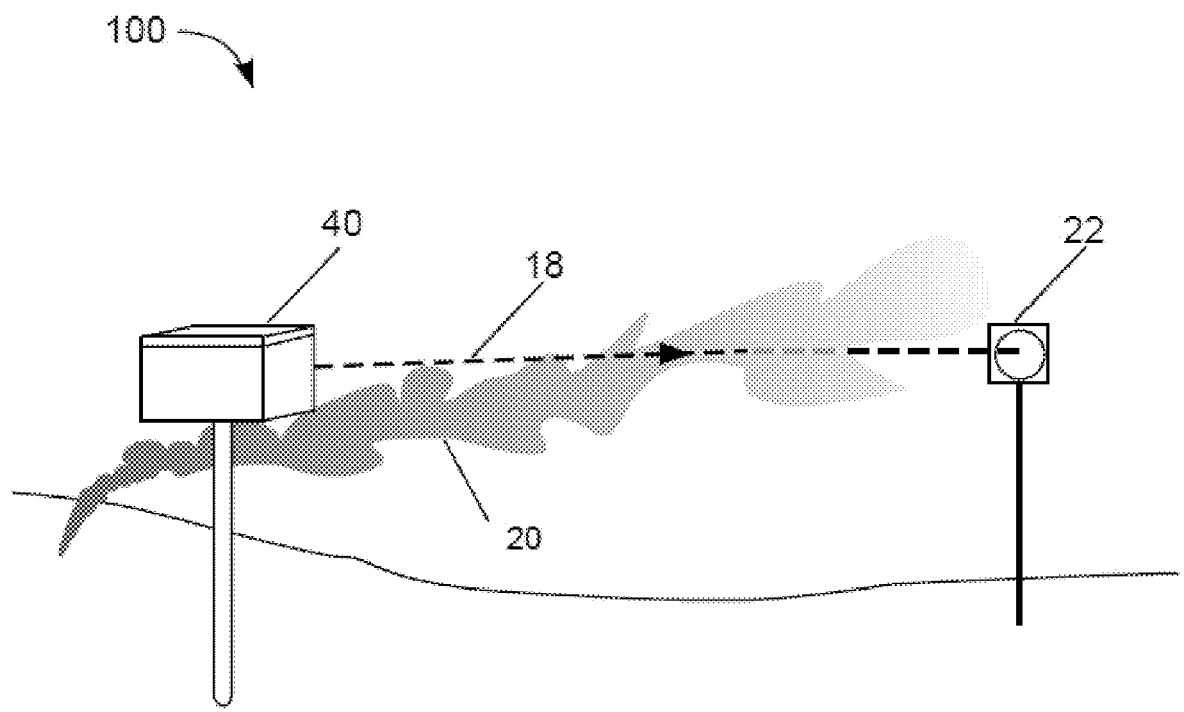
FIG. 1 is a diagram of a gas leak detection system according to an illustrative embodiment of the invention.
Figure 1A:
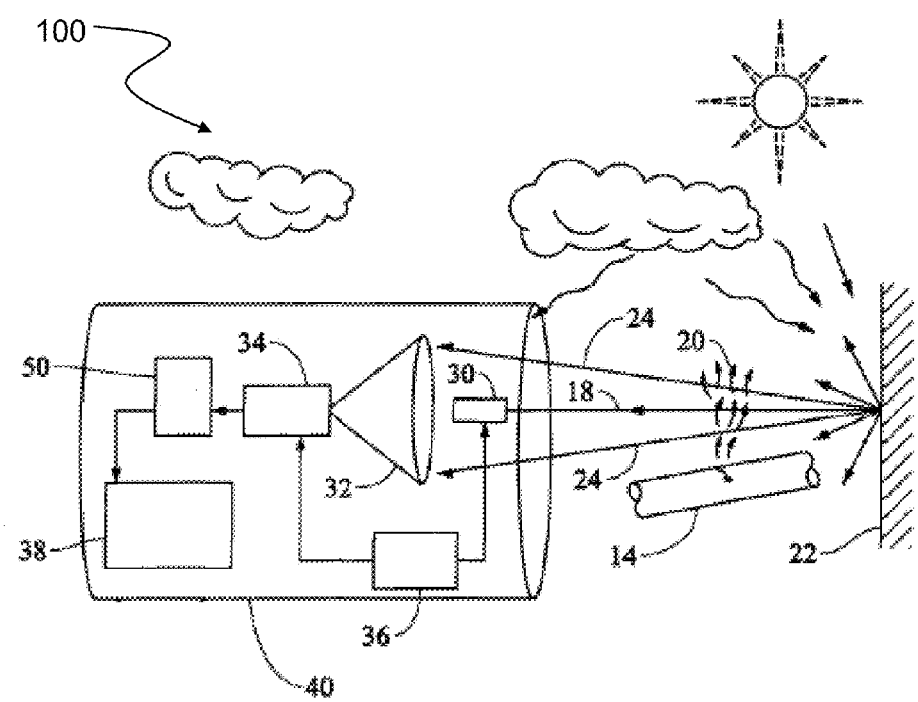
FIG. 1A is a diagram of gas leak detection system according to an illustrative embodiment of the invention.

FIGS. 1 and 1A depict a gas leak detection system 100 in accordance with an illustrative embodiment of the present invention. The gas leak detection system 100 includes a control unit 40 and a reflective target 22. The control unit 40 includes a laser 30, a system controller 36, a photodetector 32, a signal processing module 34, a statistics module 50, and a communication module 38. During operation, the laser 30 emits a beam 18 that traverses a distance before being reflected by the reflective target 22. In some embodiments, the laser beam traverses a path of several tens to hundreds of meters at an elevation of 0.5 m to 5 m above the ground before being reflected. The reflected beam 24 then travels back to the control unit where it is detected by the photodetector 32. The detected signal can then be processed by signal processing module 34 which outputs a concentration signal representative of the gas concentration in the path traversed by the laser beam. In some embodiments, the signal processing module 34 can average the detected signal received from the photodetector 32 over a time interval. The concentration signal can then be passed to the statistical processing module 50. The statistics module 50 can store the concentration signal in memory. The statistics module 50 can then determine the presence of a gas leak by performing various types of statistical analysis on the stored concentration signals. The statistics module 50 can then send an alarm signal to the communication module 38. The communication module 38 can then alert a human operator of a detected gas leak by either wired or wireless communications. The control unit 40 and reflective target 22 can be operated in proximity to gas line installation 14 to detect leaked gas 20 as it escapes the gas line installation 14. The leaked gas 20 can be transported by the wind through the path of the laser.

In some embodiments, the leaked gas 20 can diffusely travel through the path of the laser. The ambient concentration of gas can vary significantly, 50% or more, over periods of a few hours while a leak that is small but significant can create a much smaller change in the measured signal. Additionally, the signal due to the leaked gas may be smaller than the random sensor noise.

In some embodiments, the leaked gas 20 may form a plume having a turbulent structure. As turbulent eddies from the gas leak cross the beam path, they can cause short-lived increases in the measured signal relative to the background signal. These increased signals typically fluctuate on time scales of seconds, as compared to variations in background signals that can have time scales of many minutes or hours. These signals cause predominantly positive fluctuations relative to an average in the measured gas concentration (positive skewness), while fluctuations due to environmental and systematic noise tends to cause negative and positive fluctuations relative to an average in more or less equal proportions (zero skewness).

In some embodiments, the gas leak detection system 100 uses higher-order statistics such as skewness to recognize and distinguish temporal signal patterns exhibiting predominantly positive fluctuations and identify them as indicators of gas leaks.

In some embodiments, the statistics module 50 can compute the skewness or standard deviation of the concentration signal over a time interval. The statistics module 50 can then compare a combination of the standard deviation and skewness to a predetermined threshold and set an alarm to a first value (e.g., 1) if the combination exceeds the predetermined threshold. For example, the combination can be the skewness multiplied by the standard deviation, and the predetermined threshold can be 7. However, it is important to note that the invention is not limited to this particular embodiment utilizing a combination of the skewness and standard deviation. The use of any moment, higher order moment, L-moment, L-statistic, L-cumulant, or any combination thereof is within the scope of the present invention. The statistics module 50 can check periodically (e.g., every 5 minutes) if the alarm condition is satisfied (i.e., checks whether the combination of the standard deviation and skewness exceeds a predetermined threshold). The statistics module 50 can hourly compute the number of times the alarm condition was satisfied, and can further compute an alarm probability based thereon. The statistics module 50 can send a small leak alarm signal to the communication module 38 upon the alarm probability exceeding a predetermined threshold (e.g., 10%). The predetermined thresholds can be set locally or remotely, via communications module 38.

The gas leak detection system 100 can be used in a variety of applications including detecting leaks from natural gas gathering, storage, transmission, distribution pipeline infrastructure, and carbon dioxide transmission and sequestration infrastructure. The gas leak detection system 100 can also be used to detect leaks from chemical processing infrastructure, for example with a network of open-path sensors forming a "fenceline" surrounding the perimeter of a chemical plant. Additionally, the gas leak detection system 100 can be used to detect abnormal intermittent emissions of vapors from anthropogenic, biogenic, and geologic sources such as landfills, farms and other agricultural operations, bogs, and volcanic activities.

In some embodiments, the gas leak detection system 100 can be deployed in an urban environment. In the urban environment, a gas transmission pipeline can be buried under a street with utility poles on either side. A TDLAS transceiver can be mounted to a utility pole together with a communications antenna and an attached solar panel to provide power thereto. The TDLAS transceiver can emit a laser beam that crosses the street and is reflected back to the TDLAS transceiver by a retroreflective target. The height of the TDLAS transceiver and retroreflective target can be adjusted to avoid any obstacles imposed by the urban environment (e.g. billboards, food carts, traffic). In some embodiments, a TDLAS transceiver and an associated retroreflector are located every 500 feet along the busy street, under which the transmission pipeline is buried.

In some embodiments, the gas leak detection system 100 is deployed in a remote location and includes a solar cell to provide power thereto.

In some embodiments, the gas leak detection system 100 can send a big leak alarm signal if the average gas concentration exceeds a predetermined threshold indicative of a large leak. A big leak alarm may require an immediate response from a human operator.

In some embodiments, the statistics module 50 executes the following steps every six seconds: (1) measure and store the concentration value averaged over 100 ms; (2) compute the average of the previous 5 minutes of stored concentration values; (3) compute a parameter equal to the skewness of the stored concentration values multiplied by the standard deviation of the stored concentration values; (4) compare the computed parameter to a predetermined threshold and if the parameter is greater than the predetermined threshold, sets an alarm equal to one and otherwise sets the alarm equal to zero. Additionally, the statistics module 50 can execute the following steps every hour: (1) compute an alarm probability as the average value of the alarm for the previous hour; (2) compare the average value of the alarm over the previous hour to a small leak alarm threshold and if the average value of the alarm is greater than the small leak alarm threshold transmit a small leak alarm signal to the communication module 38.

In some embodiments, the communication module further includes a digital display and interface that can show the information being transmitted by the communication module (e.g. alarm signals). Additionally, the digital display can show the currently measured concentration values as well as results of statistical analysis performed by the statistics module (e.g. information such as that shown in FIGS. 2-3).

The digital interface may allow a user to set various parameters of the modules contained within control unit 40. For example, the digital interface may allow a user to query and set parameters related to the statistical analysis being performed by statistics module 50 (e.g., setting the predetermined threshold that determines the presence of a small leak).

Figure 2:
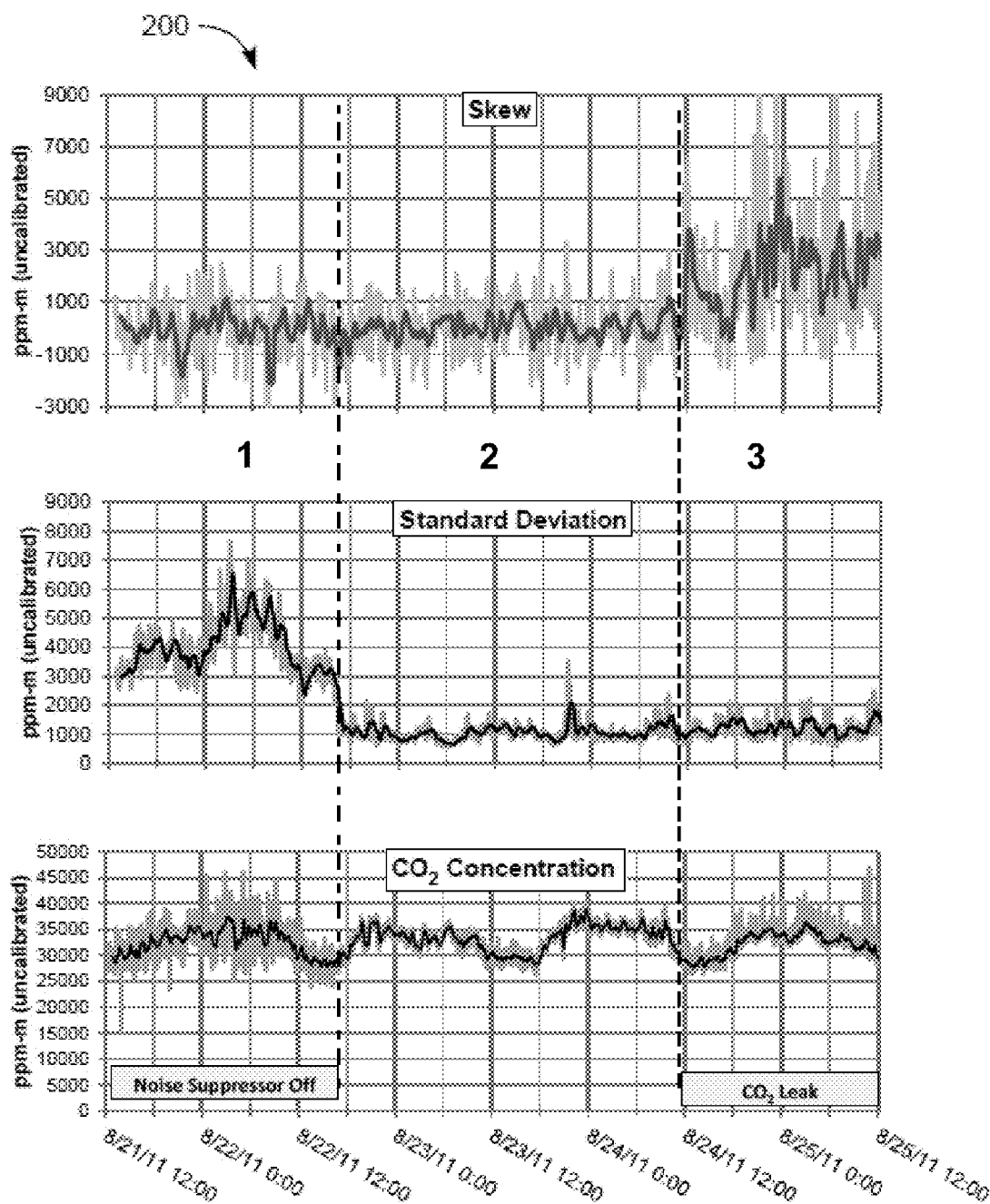
FIG. 2 is a graph showing gas concentration and various statistical quantities related to the gas concentration such as standard deviation and skewness plotted against time, according to an illustrative embodiment of the invention.

FIG. 2 is a graph showing the total amount of gas measured in the beam path plotted against time as measured by the gas leak detection system 100 according to an illustrative embodiment of the invention. Additionally, statistical properties of the measured gas concentration, as calculated by the statistics module 50 are plotted in FIG. 2. In FIG. 2, dark traces correspond to a moving average of the lighter traces. For example, FIG. 2 shows the $CO_2$ concentration, skewness, and standard deviation as well as moving averages of the $CO_2$ concentration, skewness, and standard deviation. The data shown in FIG. 2 was measured over a period of four days and can be viewed as having three distinct regions indicated by the dashed vertical lines. A first region covers times up to about 12:00 on August 22nd. A second region covers times from about 12:00 on August $22^{nd}$ to about 12:00 on August 24th. There are no gas leaks during the first and second regions. A third region covers times from about 12:00 on August 24th and onward. At the boundary of the first and second regions, techniques to reduce random systematic noise were activated. They persist throughout the second and third regions. At the boundary of the second and third region, a small $CO_2$ gas leak was purposefully started. The leak persists throughout the third region. A comparison of the first and second regions shows that by application of noise reduction techniques, random positive and negative fluctuations in the measured concentration signal, represented by the statistical quantity of standard deviation, can be significantly reduced while having little influence on the higher-order statistical quantity of skewness. Data plotted in the third region shows how the various signals changed in response to the small introduced leak. Since the introduced leak was small, there is no distinct difference between the measured moving average of the CO2 concentration in the second and third regions. Likewise, there is no distinct difference between the standard deviation shown in the second and third regions. However, there is an easily discernible change in the skewness between the second and third regions. This change in the skewness is indicative of the small introduced gas leak.

Figure 3A:
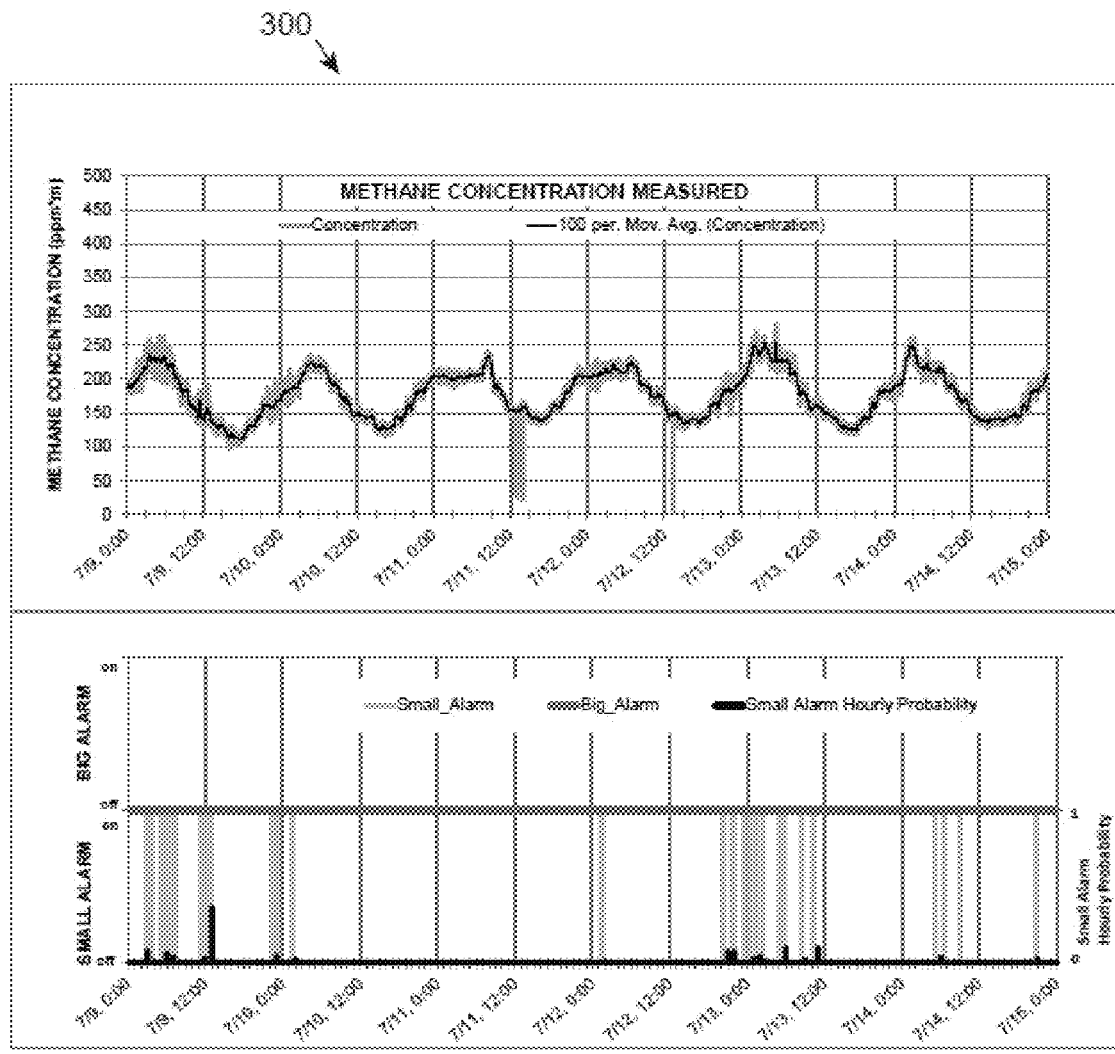
FIGS. 3A-3D are graphs showing measured methane concentration and related alarm signals plotted against time, according to an illustrative embodiment of the invention.

FIG. 3A shows a graph of measured methane concentration over a period of about six days, beginning on about July 9$^{th}$ and ending on about July 15$^{th}$. The methane concentration signal shown in the top portion of FIG. 3A is exemplary of the day-to-day periodic fluctuations in the background methane gas concentration that can mask the occurrence of small leaks. During this time period, gas leak detection system 100 was in operation and various outputs of the statistics module were recorded and are shown in the bottom portion of FIG. 3A. The bottom portion of FIG. 3A shows the big alarm value, small alarm value, and small alarm hourly probability as computed by the statistics module 50. A big alarm value of "on" can be indicative of a large leak, and occurs when the statistics module has determined that the measured methane concentration is greater than a first predetermined threshold. During the six days corresponding to the data shown in FIG. 3A, no big alarm signals occurred. A small alarm value of "on" occurs when the statistics module has determined that the combination of the standard deviation and skewness is greater than a second predetermined threshold. A small alarm value of "on", by itself, is not necessarily indicative of a small leak. A small alarm hourly probability is the ratio of the number of small alarm "on" values to the number of small alarm "off" values. A small alarm probability exceeding a third predetermined threshold (e.g., 10%) can be indicative of a small gas leak. The bottom portion of FIG. 3A shows that a small leak was detected on July 9$^{th}$, around 12:00. This small leak can be attributed to a leak occurring at a natural gas filling station about one quarter of a mile away from the gas leak detection apparatus 100.

Figure 3B:
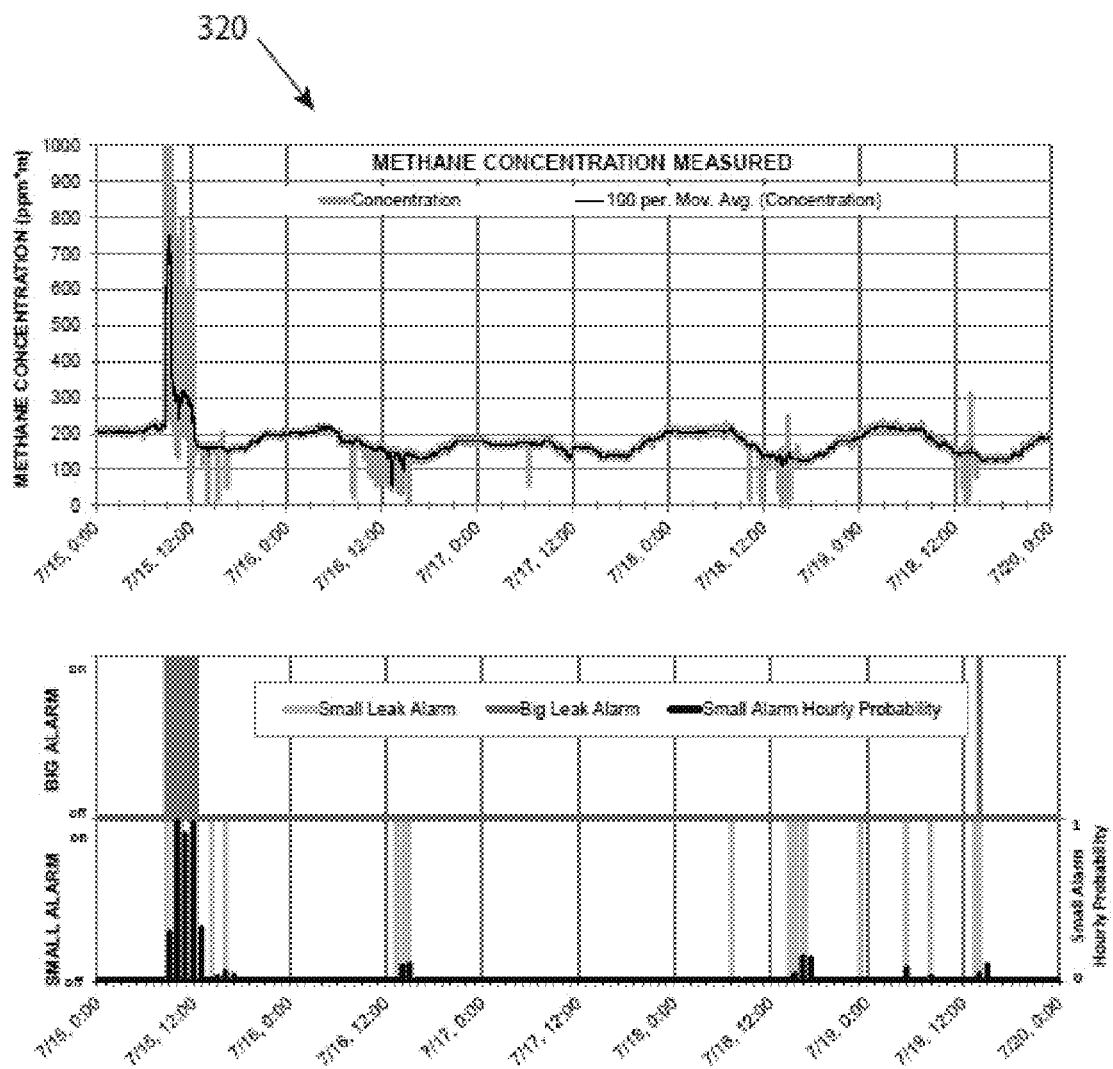

Similar to FIG. 3A, FIG. 3B shows a graph of measured methane concentration and various outputs of the statistics module over a period of about five days, beginning on about July 15th and ending on about July 20th. On July 15th, from 8:40 am until 12:15 pm, a large leak was introduced into the system. In response to the intentionally introduced large leak, a big alarm signal was output by the statistics module 50 as shown in the bottom portion of FIG. 3B. Consistent with the big alarm signal, the small alarm probability reached nearly 100% during the time interval when the large leak was active. Additionally, small leaks were detected on July 16th, 18th, and 19th during activities at the test site.

Figure 3C:
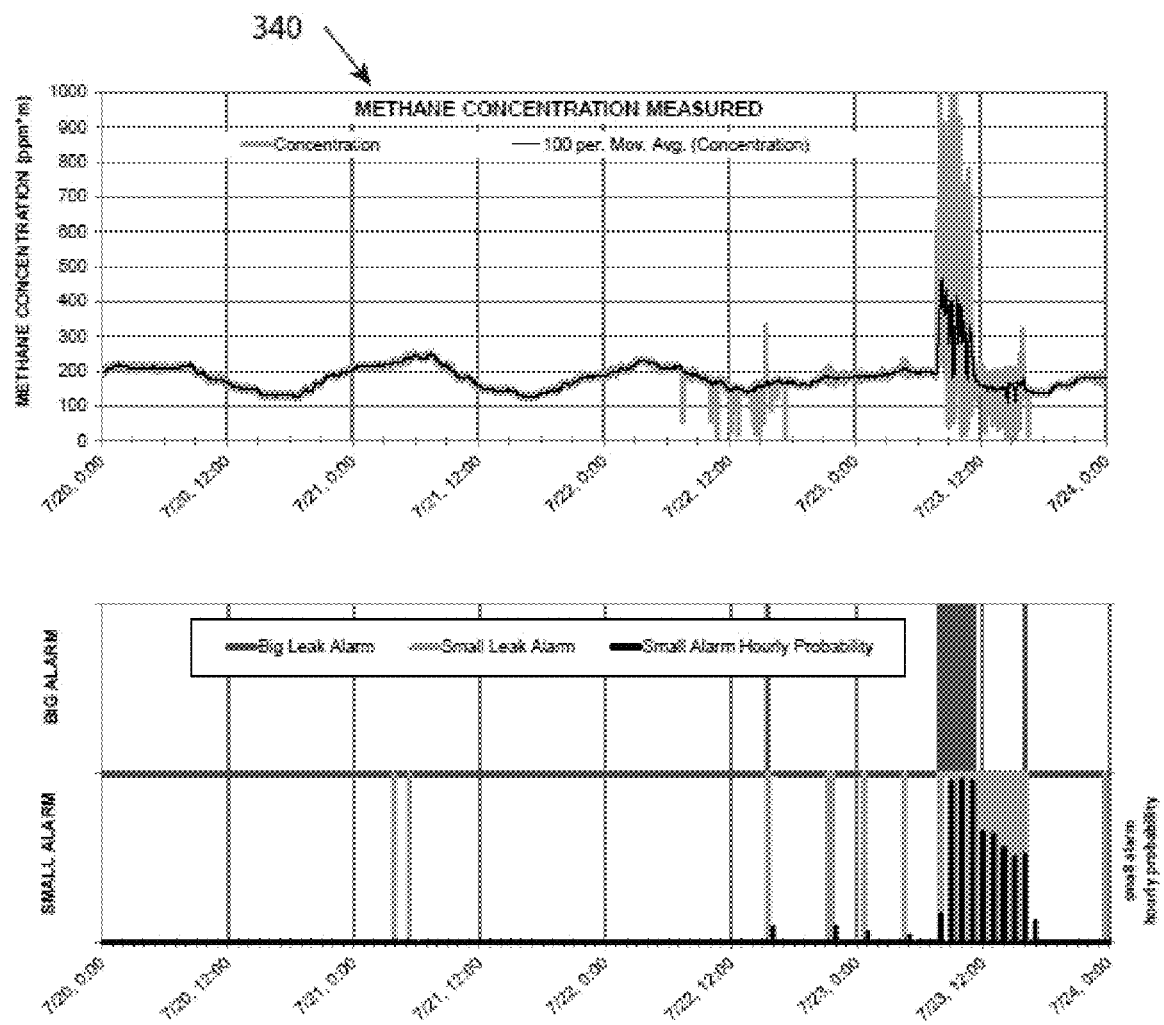
Figure 3D:
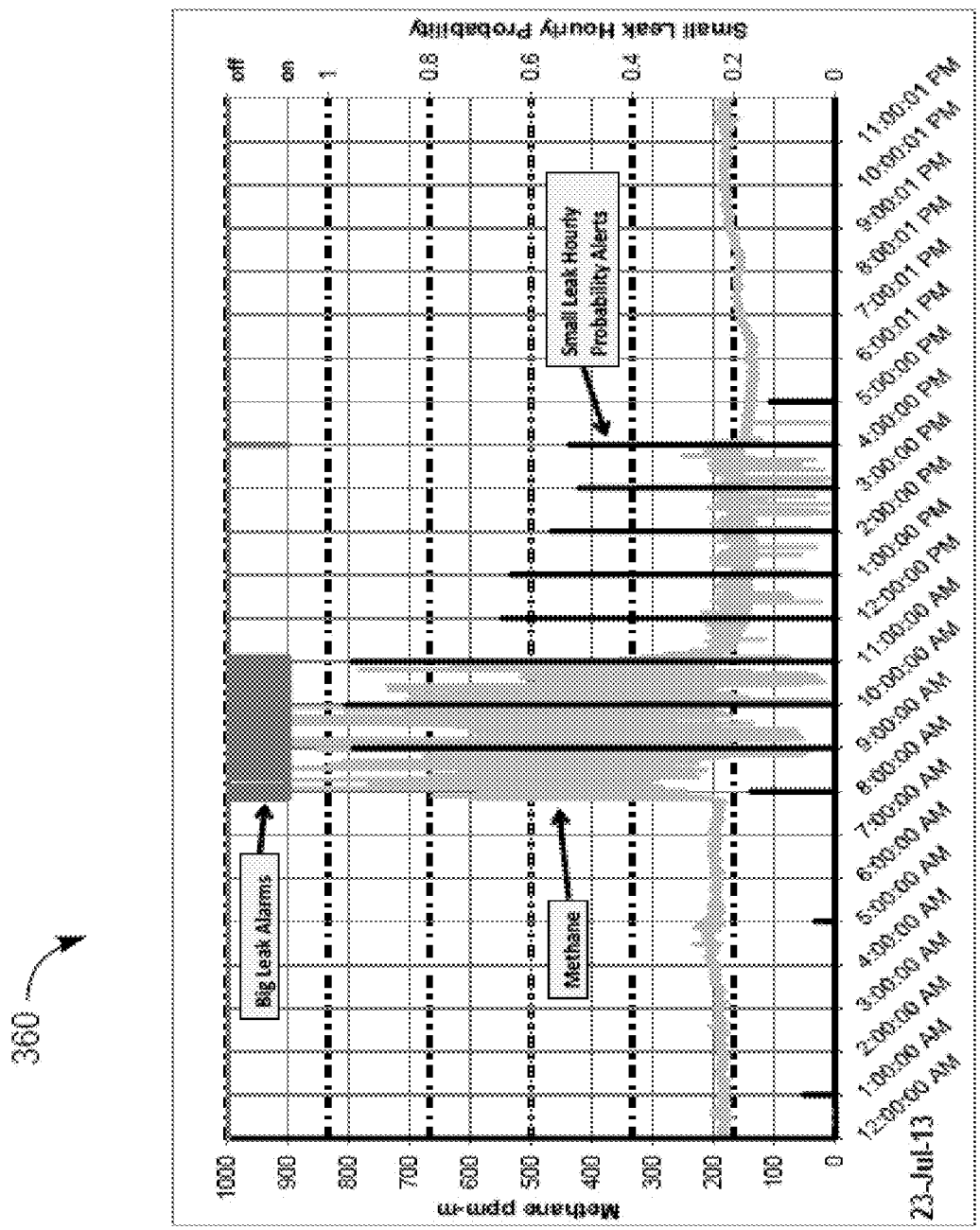

Similar to FIGS. 3A and 3B, FIG. 3C shows a graph of measured methane concentration and various outputs of the statistics module over a period of about four days, beginning on about July 20$^{th}$ and ending on about July 24$^{th}$. On the afternoon of July 22$^{nd}$, a big leak was introduced into the system for a short time. In response to this leak, a big alarm signal was output by the statistics module 50 as shown in the bottom portion of FIG. 3C. Additionally, a series of large, long leak trials were conducted on July 23$^{rd}$. In response to the trials, a series of small alarms and a continuous big alarm were output by the statistics module 50 as shown in the bottom portion of FIG. 3C. FIG. 3D shows a zoomed in view of the time period covering July 23$^{rd}$ when the large long leak trials occurred.

Figure 4:
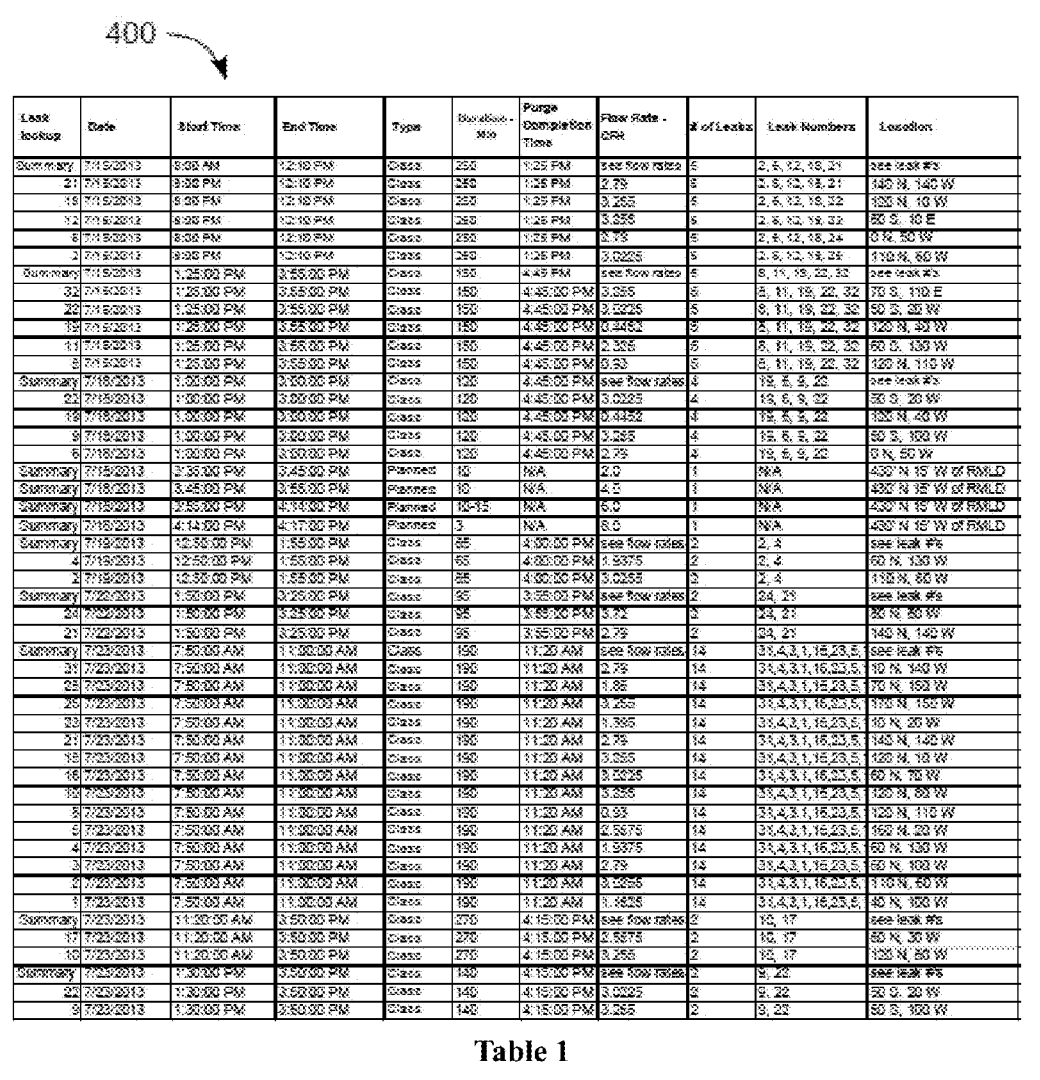

FIG. 4 is a table of test leak data that shows relevant properties of the leaks introduced at the test site during the time periods covered by FIGS. 3A-3D according to an illustrative embodiment of the invention. The table includes the date of the leak, the time the leak started, the time the leak was stopped, the type of leak (e.g., a class leak was a leak introduced for classroom training purposes and a planned leak was a leak used to test a leak detection apparatus), the duration of the leak, the purge completion time (i.e., the time after which all methane had been purged from the gas pipelines following a training class), the flow rate of the leak, leak numbers (e.g., to identify a particular leak), and the location of the leak. The test leaks described in FIG. 4 were located between 10 feet and 170 feet from the laser path of the gas leak detection system 100 that was used to collect the data in FIGS. 3A-3D.

Figure 5:
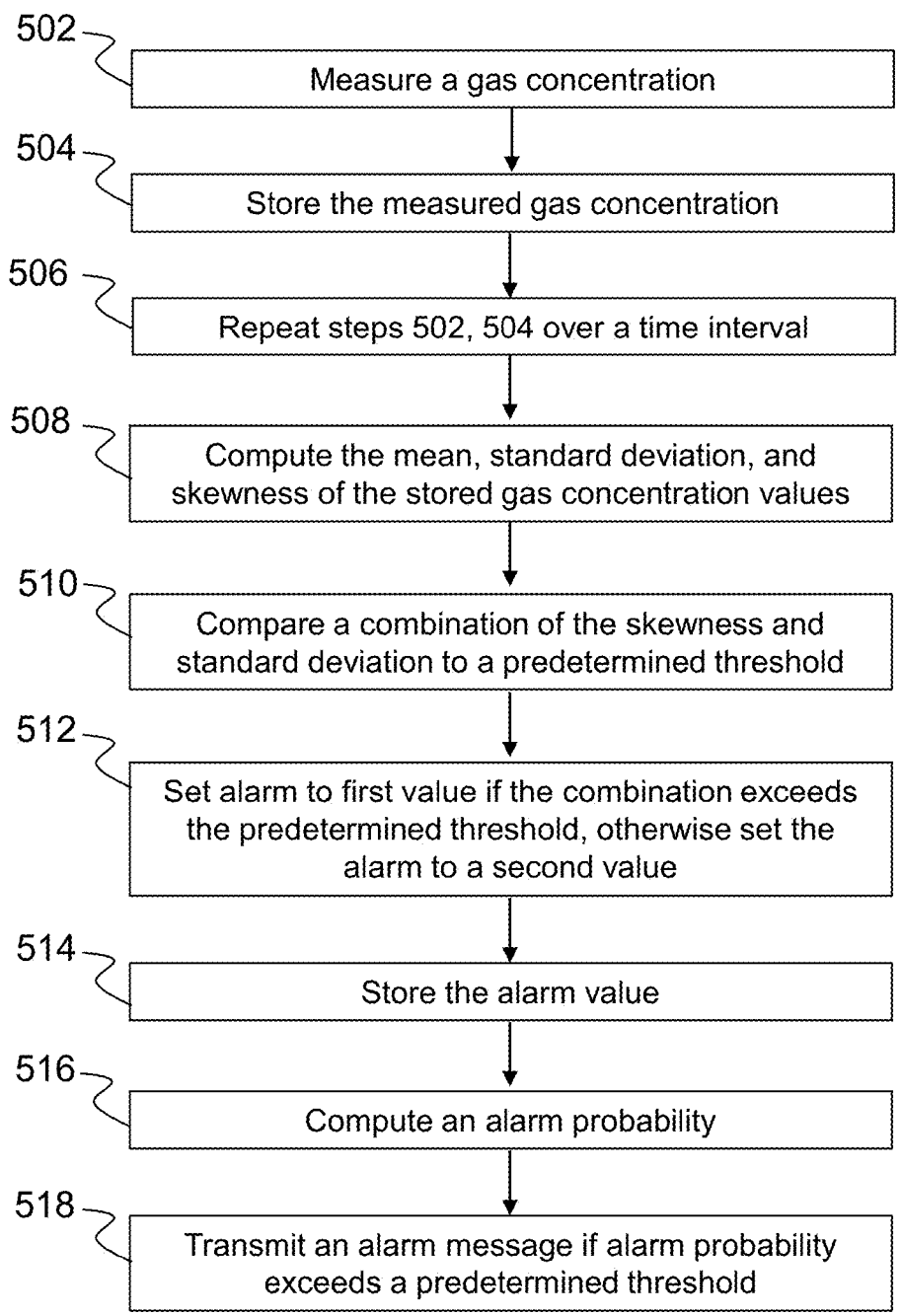
FIG. 5 is a flow chart illustrating a method in accordance with one embodiment for detecting a gas leak.

FIG. 5 describes a method of detecting a gas leak according to an illustrative embodiment of the claimed invention.

The method includes, measuring a gas concentration or a quantity proportional to the gas concentration (Step 502). The gas concentration can be measured by for example, gas leak detection system 100. In various embodiments, the gas can be $CO_2$, $CH_4$, HF, $H_2S$, HCl, $NH_3$, or other hazardous gases detectable by open-path sensors. The measured gas concentration can be averaged over a short time interval by signal processing module 34 to reduce statistical fluctuations (e.g., the gas concentration can be averaged over a time interval of 10 ms or 100 ms).

The method also includes storing the measured gas concentration (Step 504). Statistics module 50 can include a memory for storing measured gas concentration values. The method also includes repeating the measuring and storing steps (Step 506).

The method also includes computing the mean, standard deviation, and skewness of the stored gas concentration values (Step 508). In some embodiments the kurtosis or other higher-order statistics can be calculated by statistics module 50. The table shown in FIG. 6 provides a summary of various statistical quantities and how they can be calculated according to an embodiment of the invention. Additionally, in some embodiments, L-moments, L-cumulants, L-statistics, or other higher-order statistics can be computed by statistics module 50.

The method also includes comparing a combination of the skewness and standard deviation to a predetermined threshold (Step 510). The statistics module 50 can make a comparison of the combination to the predetermined threshold. The combination can be the standard deviation multiplied by the skewness and the predetermined threshold can be 7. In some embodiments, the combination can be a polynomial of the standard deviation multiplied by a polynomial of the skewness.

The method also includes setting an alarm to a first value if the combination exceeds the predetermined threshold and otherwise, setting the alarm to a second value (Step 512). The statistics module can set the alarm to a value of one if the combination exceeds the predetermined threshold and can otherwise set the alarm to a value of zero.

The method also includes storing the alarm value in memory (Step 514). The statistics module 50 can store the alarm value in memory.

The method also includes computing an alarm probability (Step 516). In some embodiments, the statistics module 50 can compute an alarm probability on an hourly basis. The alarm probability can be calculated based on the stored alarm values in memory. For example, the alarm probability can be calculated as the number of alarm values equal to a first value (e.g., 1 or "on") divided by the number of alarm values equal to a second value (e.g. 0 or "off"). In the event that the alarm probability is calculated on an hourly basis, then the alarm probability can be calculated on the basis of the alarm values stored during the one hour prior to the calculation. Other time intervals are contemplated by the present invention, for example, the alarm probability can be calculated every minute, every 15 minutes, or every two hours. Additionally, the alarm probability calculation can be based on values stored within the last minute, 15 minutes, or two hours. The frequency of the alarm probability calculation need not be related to the stored values used in the calculation thereof. For example, an hourly alarm probability calculation can be based on values stored during the two hours prior to the calculation.

The method also includes transmitting an alarm message if the alarm probability exceeds a predetermined threshold (Step 518). The statistics module can compare the computed alarm probability to a predetermined threshold (e.g., 10%).

The terminology used herein is for the purpose of describing particular embodiments and is not intended to be limiting of the inventive concepts. It will be understood that, although the terms first, second, third etc. are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present application.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. In a gas pipeline or storage system, a method for detecting gas leaks using a tunable diode laser absorption spectroscopy transceiver, a reflective target, and an open-path laser beam, the transceiver and the reflective target aligned and maintained in a fixed spatial relationship, the method comprising the steps of:
   a) measuring a gas concentration over a first time interval based on a characteristic of light reflected from the open-path laser beam;
   b) repeating a plurality of times the previous step of measuring a gas concentration over a first time interval, the plurality of first time intervals being continuous during a second time interval;
   c) averaging the plurality of measured gas concentration values obtained over the second time interval and storing the averaged value in a memory;
   d) computing a standard deviation and a higher-order statistic of the plurality of measured gas concentration values relative to the stored average value, wherein the higher-order statistic is a function of a third or higher power of a statistical sample, including a skewness, a moment, a higher order moment, an L-moment, an L-statistic, an L-cumulant, or a kurtosis;
   e) computing an alarm value based on the standard deviation, the higher-order statistic and a first predetermined threshold;
   f) storing the alarm value in a memory;
   g) repeating a plurality of times steps a, b, c, d, e and f;
   h) computing an alarm probability based on a plurality of stored alarm values; and
   i) transmitting an alarm message if the alarm probability is greater than a second predetermined threshold.

2. The method of claim 1 wherein a path length of the open-path laser beam is greater than 100 feet in length.

3. The method of claim 1, wherein the higher-order statistic comprises a skewness.

4. The method of claim 2 further comprising measuring the gas concentration via tunable diode laser absorption spectroscopy.

5. The method of claim 2 wherein the first time interval is 100 ms.

6. The method of claim 2 wherein the second time interval is 5 minutes.

7. The method of claim 3 wherein the step of computing the alarm value comprises:
   calculating a parameter by multiplying the standard deviation by the skewness; and
   comparing the parameter to the first predetermined threshold.

8. The method of claim 3 wherein the step of computing the alarm value is based on a polynomial of the standard deviation multiplied by a polynomial of the skewness.

9. The method of claim 2 wherein the measured gas is one of $CO_2$, methane, hydrogen fluoride, hydrogen sulfide, or ammonia.

10. The method of claim 1 further comprising comparing the measured gas concentration with a third predetermined threshold and transmitting an alternate alarm message if the measured gas concentration is greater than the third predetermined threshold.

11. In a gas pipeline or storage system, a method for detecting gas leaks using a tunable diode laser absorption spectroscopy transceiver, a reflective target, and an open-path laser beam, the transceiver and the reflective target aligned and maintained in a fixed spatial relationship, the method comprising:
   a) measuring and storing a gas concentration value averaged over a first time interval based on a characteristic of light reflected from the open-path laser beam;
   b) repeating a plurality of times the above step of measuring and storing a gas concentration value averaged over a first time interval, the plurality of first time intervals being continuous during a second time interval;
   c) computing an average value of the plurality of stored gas concentration values obtained over the second time interval and storing the average value;
   d) computing a standard deviation and a skewness of the plurality of stored gas concentration values obtained over the second time interval;
   e) computing an alarm value based on the standard deviation, the skewness and a first predetermined threshold;
   f) storing the alarm value in a memory;
   g) repeating steps a, b, c, d, e and f a plurality of times during a third time interval;
   h) computing an alarm probability based on a plurality of stored alarm values obtained over the third time interval; and i) transmitting an alarm message if the alarm probability is greater than a second predetermined threshold.

12. The method of claim 11, wherein each time interval of the plurality of first time intervals is 100 ms.

13. The method of claim 12, wherein the second time interval is 5 minutes.

14. The method of claim 12, wherein the third time interval is 1 hour.

15. The method of claim 11, wherein the step of computing an alarm value comprises:
calculating a parameter by multiplying the standard deviation by the skewness; and
comparing the parameter to the first predetermined threshold.

16. The method of claim 15, wherein the alarm value is set to a first value if the parameter is greater than the first predetermined threshold and set to a second value if the parameter is not greater than the first predetermined threshold.

17. The method of claim 16, wherein the step of computing an alarm probability comprises calculating the average of the plurality of stored alarm values for the third time interval.

18. The method of claim 11, wherein the step of computing an alarm probability comprises calculating the average of the plurality of stored alarm values for the third time interval.

19. The method of claim 11, further comprising the steps of:
comparing the average value of the plurality of stored gas concentration values obtained over the second time interval with a third predetermined threshold; and
transmitting a second alarm message if the average value of the plurality of stored gas concentration values is greater than the third predetermined threshold.

20. The method of claim 11, wherein the gas is one of $CO_2$, methane, hydrogen fluoride, hydrogen sulfide, or ammonia.

21. The method of claim 11, wherein the skewness is obtained by the equation $$g_1 = \frac{1}{N} \sum_{i=1}^{N} \frac{(x_i - \mu)^3}{\sigma^3}$$

wherein $g_1$ is the skewness, N is the number of stored gas concentration values $x_i$ obtained over the second time interval, $\mu$ is the average value of the stored gas concentration values over the second time interval, and $\sigma$ is the standard deviation of the stored gas concentration values over the second time interval.

22. In a gas pipeline or storage system, a method for detecting gas leaks using a tunable diode laser absorption spectroscopy transceiver, a reflective target, and an open-path laser beam, the transceiver and the reflective target aligned and maintained in a fixed spatial relationship, the method comprising:

a) measuring and storing a gas concentration value averaged over a first time interval based on a characteristic of light reflected from the open-path laser beam;

b) repeating a plurality of times the above step of measuring and storing a gas concentration value averaged over a first time interval, the plurality of first time intervals being continuous during a second time interval;

c) computing an average value of the plurality of stored gas concentration values obtained over the second time interval and storing the average value;

d) computing a standard deviation and a kurtosis of the plurality of stored gas concentration values obtained over the second time interval;

e) computing an alarm value based on the standard deviation, the kurtosis and a first predetermined threshold;

f) storing the alarm value in a memory;

g) repeating steps a, b, c, d, e and f a plurality of times during a third time interval;

h) computing an alarm probability based on a plurality of stored alarm values obtained over the third time interval; and i) transmitting an alarm message if the alarm probability is greater than a second predetermined threshold.

23. The method of claim 22, wherein the step of computing an alarm probability comprises calculating the average of the plurality of stored alarm values for the third time interval.

24. The method of claim 22, further comprising the steps of:
comparing the average value of the plurality of stored gas concentration values obtained over the second time interval with a third predetermined threshold; and
transmitting a second alarm message if the average value of the plurality of stored gas concentration values is greater than the third predetermined threshold.

25. The method of claim 22, wherein the gas is one of $CO_2$, methane, hydrogen fluoride, hydrogen sulfide, or ammonia.

26. The method of claim 22, wherein the kurtosis is obtained by the equation $$g_2 = \frac{1}{N} \sum_{i=1}^{N} \frac{(x_i - \mu)^4}{\sigma^4}$$

wherein $g_2$ is the kurtosis, N is the number of stored gas concentration values $x_i$ obtained over the second time interval, $\mu$ is the average value of the stored gas concentration values over the second time interval, and $\sigma$ is the standard deviation of the stored gas concentration values over the second time interval.

* * * * *

UNITED STATES PATENT AND TRADEMARK OFFICE
CERTIFICATE OF CORRECTION

PATENT NO. : 9,797,798 B2
APPLICATION NO. : 14/163475
DATED : October 24, 2017
INVENTOR(S) : Michael B. Frish Page 1 of 1

It is certified that error appears in the above-identified patent and that said Letters Patent is hereby corrected as shown below:

In the Specification

Beginning at Column 1, Line 5, the U.S. Government support paragraph should be inserted with the following language:
--GOVERNMENT RIGHTS
This invention was made with U.S. Government support under Grant No. DE-SC0001575, awarded by the Department of Energy (DOE). The Government has certain rights in the subject invention.--

Signed and Sealed this
Thirtieth Day of December, 2025

John A. Squires
*Director of the United States Patent and Trademark Office*